(12) United States Patent
Yasuda et al.

(10) Patent No.: US 7,952,976 B2
(45) Date of Patent: May 31, 2011

(54) OPTICAL REPRODUCING DEVICE AND OPTICAL REPRODUCING METHOD

(75) Inventors: Shin Yasuda, Kanagawa (JP);
Katsunori Kawano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 391 days.

(21) Appl. No.: 12/265,293

(22) Filed: Nov. 5, 2008

(65) Prior Publication Data
US 2009/0238060 A1 Sep. 24, 2009

(30) Foreign Application Priority Data
Mar. 24, 2008 (JP) .................. 2008-076015

(51) Int. Cl.
*G11B 7/00* (2006.01)
(52) U.S. Cl. .................. 369/103; 369/124.04
(58) Field of Classification Search .......... None
See application file for complete search history.

(56) References Cited

U.S. PATENT DOCUMENTS
2007/0109943 A1 5/2007 Tsukagoshi et al.
2007/0147801 A1 6/2007 Yasuda et al.
2008/0291807 A1 11/2008 Itoh et al.

FOREIGN PATENT DOCUMENTS
| JP | 2003228848 A | 8/2003 |
|---|---|---|
| JP | 2005166103 A | 6/2005 |
| JP | 2007-179597 A | 7/2007 |
| JP | 2007200517 A | 8/2007 |
| WO | 2005109117 A1 | 11/2005 |

OTHER PUBLICATIONS

Japanese Office Action dated Nov. 4, 2009 corresponding to Japanese patent application 2008-076015.
Yasuda et al., "Optical noise reduction by reconstructing positive and negative images from Fourier holograms in coaxial holograhic storage system," *Optics Letters*, vol. 31, No. 11, Jun. 1, 2006, pp. 1639-1641.

*Primary Examiner* — Paul Huber
(74) *Attorney, Agent, or Firm* — Sughrue Mion, PLLC (57) ABSTRACT

There is provided an optical reproducing device including: a reproducing component that includes a light source, a spatial light modulator, and a light guiding component, with the reproducing component irradiating, with reference light that has been generated by the spatial light modulator as reading light, a Fourier transform hologram; a splitting component disposed on a signal light exiting side of the reproducing component and that splits, into two light waves, the signal light; a first image acquiring component that detects the one split light wave to acquire a first reproduced image; a second image acquiring component that detects light where a direct current component has been removed from the other split light wave to acquire a second reproduced image; and a decoding component that uses the first reproduced image and the second reproduced image to decode data that the signal light has.

8 Claims, 7 Drawing Sheets

OPTICAL REPRODUCING DEVICE AND OPTICAL REPRODUCING METHOD

CROSS-REFERENCE TO RELATED APPLICATION

This application is based on and claims priority under 35 USC 119 from Japanese Patent Application No. 2008-076015 filed on Mar. 24, 2008.

BACKGROUND

1. Technical Field

The present invention relates to an optical reproducing device and an optical reproducing method.

2. Related Art

In holographic data storage, binary digital data "0" and "1" are made into a digital image (signal light) as "bright" and "dark", the signal light is Fourier-transformed by a lens, and an optical recording medium is irradiated with the signal light. Then, a Fourier transform image is recorded as a hologram in the optical recording medium. In order to realize high recording density, it is necessary to increase the degree of multiplexing and increase the data amount per page (page data amount).

However, there is the problem that, when the degree of multiplexing and the page data amount increase, the affects of crosstalk noise and scattering become larger, and the signal-to-noise ratio (SNR) of the reproduced image ends up greatly dropping.

In order to address this problem, the present applicant proposes a method which, by performing a two-time reproducing operation, obtains two reproduced images depending on whether or not there is a direct current component from one Fourier transform hologram that has been recorded and, by comparing those two reproduced images, reduces noise that is common to both.

SUMMARY

According to an aspect of the invention, there is provided an optical reproducing device including:

a reproducing component that includes a light source that emits coherent light, a spatial light modulator that is configured by plural pixel components that are two-dimensionally arrayed and which modulates and outputs, per pixel and in accordance with a display pattern, light that has been made incident thereon from the light source, and a light guiding component that guides the light that has been modulated by the spatial light modulator to an optical recording medium, with the reproducing component irradiating, with reference light that has been generated by the spatial light modulator as reading light, a Fourier transform hologram that has been recorded in the optical recording medium using signal light and reference light, to thereby reproduce the signal light from the optical recording medium;

a splitting component that is disposed on a signal light exiting side of the reproducing component and splits, into two light waves, the signal light that has been made incident thereon from the optical recording medium side;

a first image acquiring component that is disposed on an exiting side of the one split light wave that has been split by the splitting component and detects the one split light wave to acquire a first reproduced image;

a second image acquiring component that is disposed on an exiting side of the other split light wave that has been split by the splitting component and detects light where a direct current component has been removed from the other split light wave to acquire a second reproduced image; and a decoding component that uses the first reproduced image and the second reproduced image to decode data that the signal light has.

The aspects of the invention have the following effects.

According to the first aspect of the invention, there is the effect that, by just a one-time reproducing operation, two reproduced images comprising an image in which a direct current component is included and an image in which a direct current component is not included can be efficiently obtained from one Fourier transform hologram that has been recorded.

According to the second aspect of the invention, there is the effect that when differences of the two images are calculated, not only can noise be cut but differences in average intensity between ON pixels and OFF pixels can be increased, that is, the contrast ratio becomes larger and the SNR improves.

According to the third aspect of the invention, there is the effect that the direct current component that is included in the signal light that has been reproduced can be removed by a simple device.

According to the fourth aspect of the invention, there is the effect that wavefront distortion that has been added to the signal light by a phase modulating element during recording is cancelled out by the same phase modulating element.

According to the fifth aspect of the invention, there is the effect that two reproduced images comprising an image in which a direct current component is included and an image in which a direct current component is not included can be efficiently obtained also from one Fourier transform hologram that has been recorded by a dual-beam (off-axis) method rather than a collinear recording method.

According to the sixth aspect of the invention, there is the effect that, by just a one-time reproducing operation, two reproduced images comprising an image in which a direct current component is included and an image in which a direct current component is not included can be efficiently obtained from one Fourier transform hologram that has been recorded.

According to the seventh aspect of the invention, there is the effect that when differences of the two images are calculated, not only can noise be cut but differences in average intensity between ON pixels and OFF pixels can be increased, that is, the contrast ratio becomes larger and the SNR improves.

BRIEF DESCRIPTION OF THE DRAWINGS

Exemplary embodiments of the present invention will be described in detail based on the following figures, wherein.

DETAILED DESCRIPTION

Below, exemplary embodiments of the present invention will be described in detail with reference to the drawings.

First Exemplary Embodiment (Hologram Recording and Reproducing Device)

Figure 1:
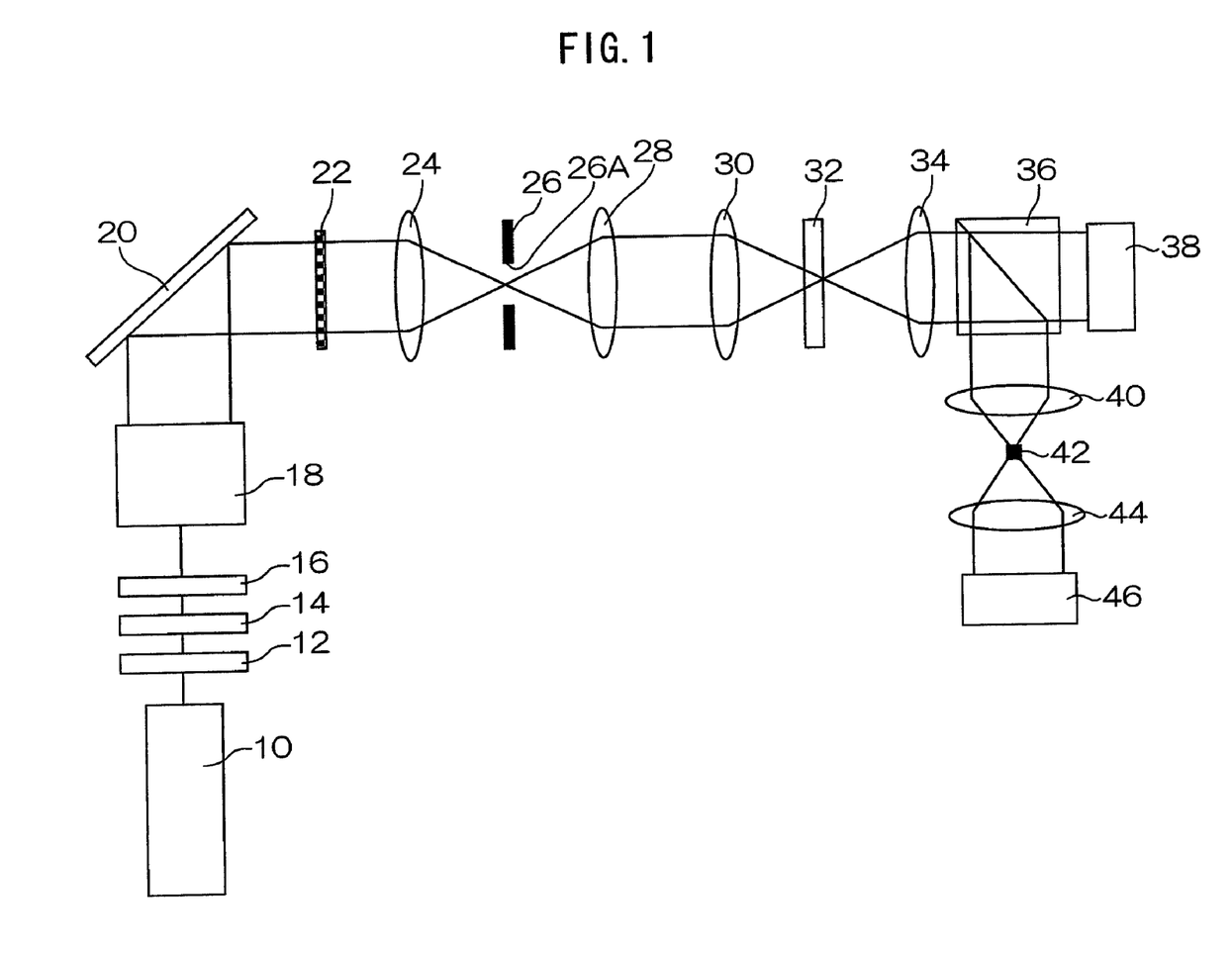
FIG. 1 is a general diagram showing the configuration of a hologram recording and reproducing device pertaining to a first exemplary embodiment of the invention.

FIG. 1 is a general diagram showing the configuration of a hologram recording and reproducing device pertaining to a first exemplary embodiment of the invention. This hologram recording and reproducing device is a "collinear recording method (collinear method)" hologram recording and reproducing device that irradiates an optical recording medium with signal light and reference light that share an optical axis as one-beam recording light from the same direction. In the present exemplary embodiment, a "collinear transmissive" hologram recording and reproducing device that uses a transmissive spatial light modulator (SLM) and a transmissive optical recording medium will be described.

In the hologram recording and reproducing device, there is disposed a light source 10 that emits laser light that is coherent light. As the light source 10, for example, there is used a laser light source that emits green laser light whose emission wavelength is 532 nm. On the light exiting side of the light source 10, a shutter 12 that is capable of being inserted into and withdrawn from (opening and closing) the optical path, a ½ wavelength plate 14 that applies an optical path difference of ½ wavelength between linearly polarized light components that are orthogonal, a polarizing plate 16 that allows light of a predetermined polarization direction to pass therethrough, a beam expander 18 that is an expanding/collimating optical system, and a reflecting mirror 20 are disposed in this order along the optical path from the side of the light source 10. The shutter 12 is driven to open and close by a drive device (not shown) that is connected to a control device (not shown) such as a personal computer.

On the light reflecting side of the reflecting mirror 20, there is disposed a transmissive spatial light modulator 22 that polarizes and modulates incident light per pixel. The incident light that has been polarized and modulated by the spatial light modulator 22 is converted into linearly polarized light (amplitude distribution) by a polarizing element (not shown) on the exiting side of the spatial light modulator 22 and is emitted. As the transmissive spatial light modulator 22, a liquid crystal spatial light modulator where transparent electrodes are formed on both sides of an electro-optical converting material such as liquid crystal can be used. The spatial light modulator 22 is connected to a control device (not shown) via a pattern generator (not shown).

The pattern generator expresses, as a bright/dark image, digital data that have been supplied from a control device to generate a signal light pattern that is displayed on the spatial light modulator 22. The signal light pattern is, for example, a digital pattern or the like where binary digital data "0, 1" are expressed as "dark (black pixels), bright (white pixels)". In the present exemplary embodiment, a signal light pattern whose white ratio is greater than 0.5 is used. "White ratio" is the ratio of white pixels in the digital pattern when 1 represents the entirety. In the present exemplary embodiment, "white ratio" becomes synonymous with "DC ratio", which is a direct current component ratio of the signal light. The ratios of white pixels and black pixels become equivalent when the white ratio is 0.5.

On the spatial light modulator 22, in addition to the signal light pattern, a reference light pattern is also displayed. The reference light pattern is, for example, a random pattern or the like. The spatial light modulator 22 modulates laser light that has been made incident thereon in accordance with the displayed signal light pattern and reference light pattern to generate signal light and reference light. The spatial light modulator 22 emits the generated signal light and reference light toward a later-described lens 24.

Figure 2A:
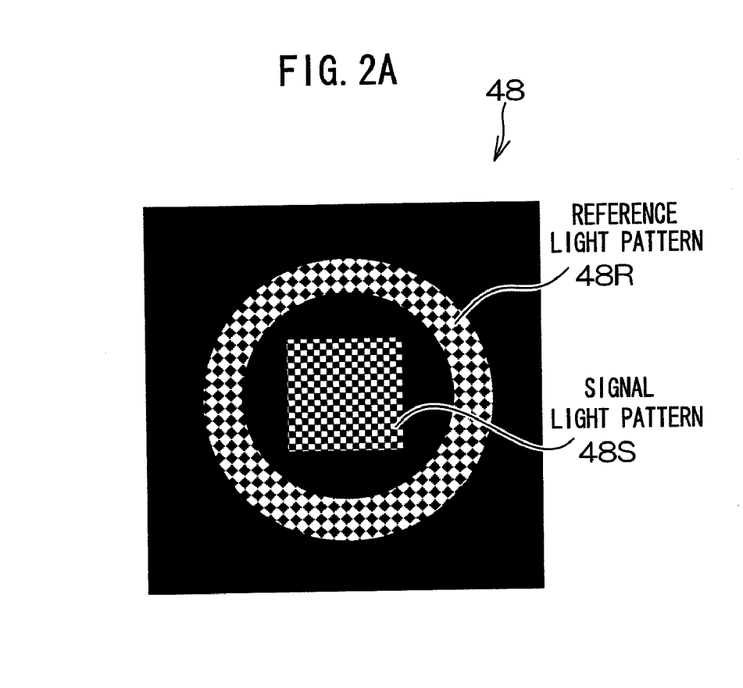
FIG. 2A is a diagram showing an example of a recording pattern that is displayed on a spatial light modulator during recording.

FIG. 2A is a diagram showing an example of a recording pattern that is displayed on the spatial light modulator 22 during recording. As shown in FIG. 2A, a recording pattern 48 is configured to include a signal light pattern 48S that generates signal light and a ring-shaped reference light pattern 48R that generates reference light. The signal light pattern 48S is displayed in the central portion of the spatial light modulator 22. The reference light pattern 48R is displayed on the peripheral portion of the spatial light modulator 22 so as to surround this signal light pattern 48S.

Figure 2B:
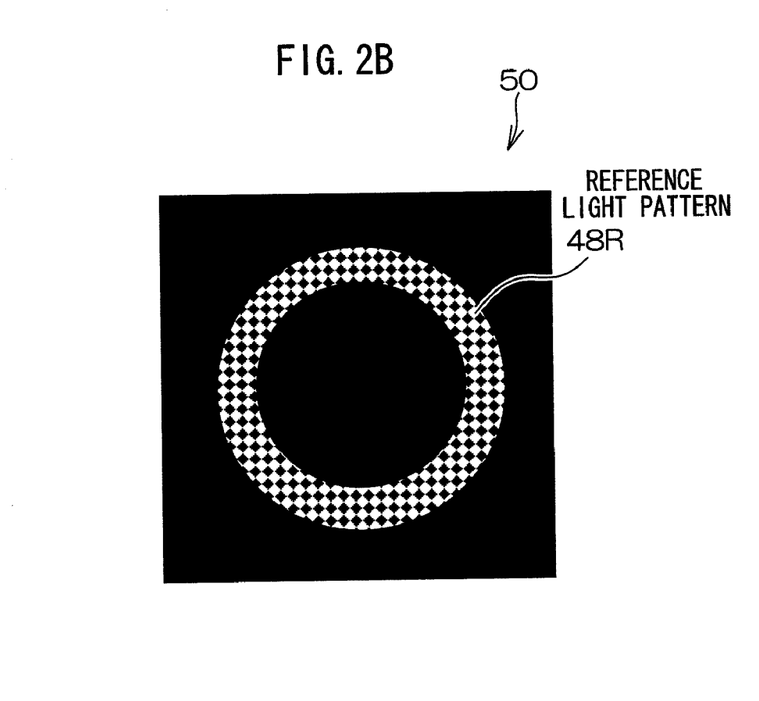
FIG. 2B is a diagram showing an example of a reproduction pattern that is displayed on the spatial light modulator during reproduction.

FIG. 2B is a diagram showing an example of a reproduction pattern that is displayed on the spatial light modulator 22 during reproduction. As shown in FIG. 2B, a reproduction pattern 50 is configured by the ring-shaped reference light pattern 48R that generates reference light that had been included in the recording pattern 48. That is, during reproduction, just the reference light pattern 48R is displayed on the display surface of the spatial light modulator 22, laser light that has been made incident thereon is modulated in accordance with the displayed reference light pattern, and just the reference light is generated.

On the light transmitting side of the spatial light modulator 22 when seen from the reflecting mirror 20 side, a pair of lenses 24 and 28 and a Fourier transform lens 30 that Fourier-transforms light that has been made incident thereon and collects the light on an optical recording medium 32 are disposed in this order along the optical path from the spatial light modulator 22 side. Between the lens 24 and the lens 28, in the vicinity of the beam waist, there is disposed a light blocking plate 26 that includes an open portion (an aperture) 26A. It will be noted that the light blocking plate 26 is not essential and can be appropriately omitted.

On the light exiting side of the Fourier transform lens 30, there is disposed a holding stage (not shown) that holds the optical recording medium 32. The holding stage is driven by a drive device (not shown) that is connected to a control device (not shown) and moves in the optical axis direction or a plane direction that is perpendicular to the optical axis. The optical recording medium 32 is an optical recording medium in which a hologram is capable of being recorded by a change in the index of refraction or transmission resulting from being irradiated with light. Examples of this optical recording medium 32 may include an optical recording medium that uses a recording material such as a photopolymer material, a photorefractive material or a silver halide photosensitive material.

On the light transmitting side of the optical recording medium 32, a Fourier transform lens 34 and half mirror 36 that transmits half of the light and reflects half of the light are disposed in this order along the optical path from the optical recording medium 32 side. The half mirror 36 functions as a "splitting component" that splits the laser light. It will be noted that, in the present exemplary embodiment, the transmitted light intensity and the reflected light intensity are equivalent.

On the light transmitting side of the half mirror 36 when seen from the Fourier transform lens 34 side, there is disposed a sensor array 38. On the light reflecting side of the half mirror 36, Fourier transform lenses 40 and 44 and a sensor array 46 are disposed in this order along the optical path from the half mirror 36 side. The sensor array 46 is disposed on a focal plane (focal point plane) of the Fourier transform lens 44.

Further, between the Fourier transform lenses 40 and 44, in the vicinity of the beam waist, there is disposed a removing member 42 that removes a direct current component of a Fourier transform image of the reproduced signal light. As the removing member 42, there is used a reflecting mirror that selectively reflects the direct current component or an absorbing member that selectively absorbs the direct current component. Alternatively, as the removing member 42, for example, there can also be used an ND filter that selectively attenuates the direct current component.

The sensor arrays 38 and 46 are configured by imaging elements such as CCDs or CMOS arrays, convert the reproduced light (diffracted light) that has been received into electrical signals, and output the electrical signals. Further, the sensor arrays 38 and 46 are connected to a control device (not shown). The sensor arrays 38 and 46 detect a reproduced image that has been imaged on their light receiving surfaces and output the image data that have been obtained to a control device (not shown). A control device (not shown) decodes the digital data that the signal light has on the basis of the image data that have been obtained from the sensor array 3 8 and the image data that have been obtained from the sensor array 46.

It will be noted that, although they are not illustrated, the control device is, as is usual, disposed with a central processing unit (CPU) that performs control and various calculations, a read-only memory (ROM) in which various programs are stored, a random access memory (RAM) that is used as a work area during execution of programs, a memory that stores various data and various programs, input devices such as a mouse and a keyboard, an output device such as a display, and a communications interface for acquiring various information from the outside. These components are interconnected by a bus such that data and signals can be transmitted and received between them. The CPU executes various processing such as later-described decoding processing while reading various programs from the ROM or the memory, loading the programs into the RAM, using the RAM as a work area, and using the input devices and the output devices to interact with a user.

(Hologram Recording Operation)

Next, recording operation of the hologram recording and reproducing device shown in FIG. 1 will be briefly described.

When a hologram is to be recorded, the shutter 12 is opened and laser light is emitted from the light source 10. At the same time, digital data are outputted from a control device at a predetermined timing, and a recording pattern (see FIG. 2A) is displayed on the spatial light modulator 22. In the present exemplary embodiment, a signal light pattern whose white ratio is greater than 0.5 is displayed. The laser light that has been emitted from the light source 10 passes through the shutter 12, and its light intensity and polarization direction are adjusted by the ½ wavelength plate 14 and the polarizing plate 16. The light that has passed through the polarizing plate 16 is converted into parallel light with a large diameter by the beam expander 18, and the reflecting mirror 20 is irradiated therewith.

The light that has been reflected by the reflecting mirror 20 is made incident on the spatial light modulator 22. In the spatial light modulator 22, the laser light is polarized and modulated in accordance with the displayed pattern such that signal light and reference light are generated. The recording light that has been polarized and modulated by the spatial light modulator 22 and has been converted into linearly polarized light by the polarizing element (not shown) is collected by the lens 24, and the light blocking plate 26 that includes the aperture 26A is irradiated therewith. The unnecessary frequency component of the recording light that has been collected by the lens 24 is cut by the light blocking plate 26, and the remaining portion passes through the aperture 26A. The recording light that has passed through the aperture 26A is converted into parallel light by the lens 28.

The recording light that has been converted into parallel light by the lens 28, that is, the signal light and the reference light are Fourier-transformed and collected by the Fourier transform lens 30, and the optical recording medium 32 is simultaneously and collinearly irradiated therewith. In the position where the signal light and the reference light are collected, an interference fringe that is formed as a result of the signal light and the reference light interfering with each other is recorded as a Fourier transform hologram in the optical recording medium 32.

(Hologram Reproducing Operation)

Next, reproducing operation of the hologram recording and reproducing device shown in FIG. 1 will be described. In the present exemplary embodiment, two reproduced images comprising a positive image and a negative image are detected from one Fourier transform hologram that has been recorded using the signal light pattern whose white ratio is greater than 0.5. First, when the signal light is to be reproduced from the hologram that has been recorded in the optical recording medium 32, the shutter 12 is opened and laser light is emitted from the light source 10. At the same time, digital data are outputted from a control device (not shown) at a predetermined timing, and a reproduction pattern (see FIG. 2B) is displayed on the spatial light modulator 22 such that the optical recording medium 32 is irradiated with just the reference light.

The laser light that has been emitted from the light source 10 is, in the same manner as in the case of recording, made incident on the spatial light modulator 22. In the spatial light modulator 22, the laser light is polarized and modulated in accordance with the displayed pattern such that the reference light is generated. The reference light that has been generated as a result of being polarized and modulated by the spatial light modulator 22 and converted into linearly polarized light by the polarizing element (not shown) is collected by the lens 24, passes through the aperture 26A, and is converted into parallel light by the lens 28. The reference light that has been converted into parallel light by the lens 28 is Fourier-transformed and collected by the Fourier transform lens 30, and the optical recording medium 32 is irradiated therewith. That is, the optical recording medium 32 is irradiated with just the reference light as reading light.

When the reference light with which the optical recording medium 32 has been irradiated is transmitted through the optical recording medium 32, the reference light is diffracted by the hologram, and the transmitted diffracted light (reproduced signal light) is emitted toward the lens 34. The reproduced signal light that has been emitted from the optical recording medium 32 is inverse-Fourier-transformed and made into parallel light by the lens 34 and is made incident on the half mirror 36. The optical path of the reproduced signal light is split into two by the half mirror 36.

The reproduced signal light that has been transmitted through the half mirror 36 is imaged on the surface of the sensor array 38. On the sensor array 38, there is imaged the original signal light pattern that was displayed on the spatial light modulator 22 during recording, that is, a positive image of the original signal light pattern. The sensor array 38 detects this reproduced signal light, and a first reproduced image (positive image) is acquired. That is, the sensor array 38 functions as a first image acquiring component.

The reproduced signal light that has been reflected by the half mirror 36 is Fourier-transformed and collected by the Fourier transform lens 40, and a direct current component is selectively removed from the Fourier transform image by the removing member 42. The reproduced signal light from which the direct current component has been removed is inverse-Fourier-transformed and collected by the Fourier transform lens 44 and is imaged on the surface of the sensor array 46. On the sensor array 46, there is imaged the reverse pattern of the original signal light pattern that was displayed on the spatial light modulator 22 during recording, that is, a negative image of the original signal light pattern. The sensor array 46 detects this reproduced signal light, and a second reproduced image (negative image) is acquired. That is, the sensor array 46 functions as a second image acquiring component.

As described above, in the present exemplary embodiment, two reproduced images comprising a positive image and a negative image are detected at the same time from one Fourier transform hologram by a one-time reproducing operation. Decoding processing will be described below, but because the positive image and the negative image can be acquired at once, the amount of time that is required from the start of reproducing operation to until the digital data are decoded using the positive image and the negative image becomes shorter. That is, transfer speed during reproduction improves.

It will be noted that the sensor arrays 38 and 46 convert the reproduced signal light that has been detected into electrical signals and output the electrical signals to a control device (not shown). That is, the sensor array 38 A/D-converts analog data that have been detected and outputs image data of the first reproduced image to a control device. The sensor array 46 A/D-converts analog data that have been detected and outputs image data of the second reproduced image to a control device. The image data of the first reproduced image and the image data of the second reproduced image are held in a storage component of the control device such as a RAM or a memory. It will be noted that, in the sensor arrays 38 and 46, it is preferable to implement oversampling where one pixel of the signal light data is received by plural light receiving elements. For example, data of 1 bit are received by four (2×2) light receiving elements.

(Principle of Negative Image Generation)

Figure 3A:
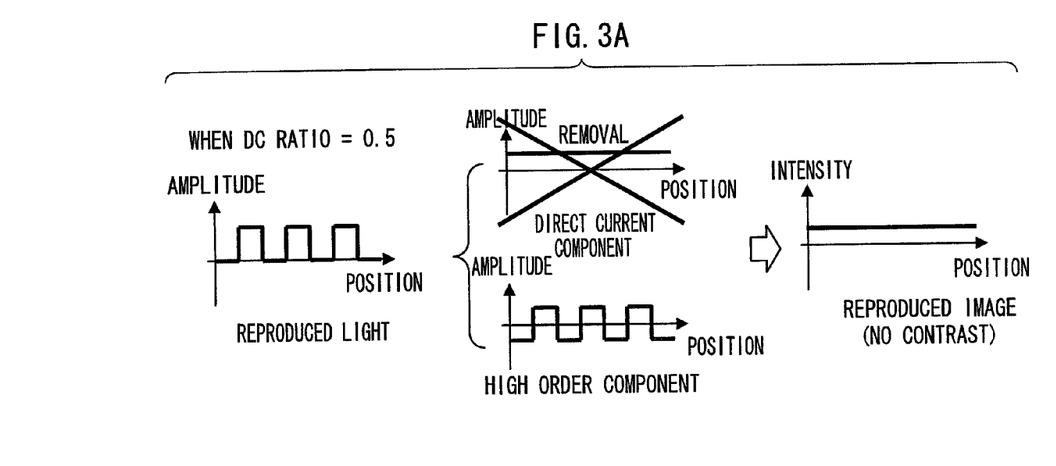
FIG. 3A is a diagram describing the reason why a negative image is obtained from a Fourier transform hologram that has been recorded using a signal light pattern whose white ratio is high.
Figure 3B:
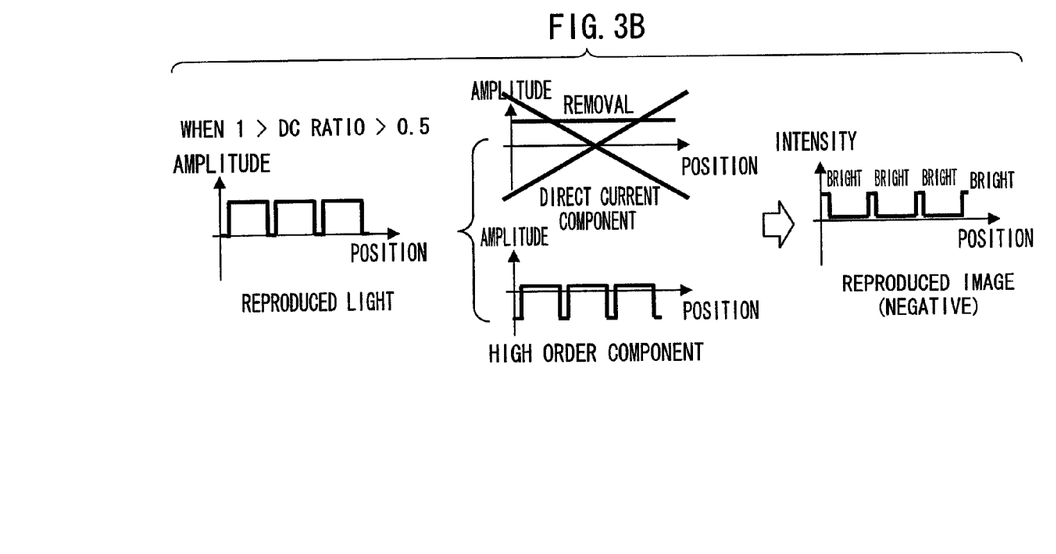
FIG. 3B is a diagram describing the reason why a negative image is obtained from a Fourier transform hologram that has been recorded using a signal light pattern whose white ratio is high.

Here, the reason why a negative image is obtained from the Fourier transform hologram that has been recorded using the signal light pattern whose white ratio (DC ratio) is greater than 0.5 will be described. As shown in FIG. 3A and FIG. 3B, removing the direct current component from the reproduced signal light is equivalent to the result of causing a direct current component (plane wave) with an amplitude of the same size (absolute value) as the direct current component included in the signal light that has been reproduced but whose phase differs by $\pi$ to interfere. At this time, the direct current component disappears because of destructive interference. As a result, the size of the amplitude of the remaining component (high order component) of the reproduced signal light changes by the size of the direct current component that has been removed (in FIG. 3A and FIG. 3B, slides in the vertical axis direction). Thus, the original bright portions become dark as a result of the size of the amplitude decreasing, and the original dark portions become bright as a result of the size of the amplitude increasing.

As shown in FIG. 3A, when the white ratio of the signal light is 0.5, when the direct current component of the signal light that has been reproduced (reproduced light) is removed, then similar to when a plane wave configured by a direct current component and a plane wave with the same intensity and a phase difference of $\pi$ are caused to interfere with each other, the contrast of the interference pattern becomes 0. In contrast, as shown in FIG. 3B, when the white ratio of the signal light is greater than 0.5 and less than 1, the absolute value of the amplitude of the dark portions of the high order component becomes greater than the amplitude of the bright portions. The intensity of the interference pattern is obtained by squaring the amplitude of the high order component. Consequently, when the white ratio of the signal light is greater than 0.5 and less than 1, when the direct current component of the signal light that has been reproduced (reproduced light) is removed, a reverse image (negative image) where the dark portions of the signal light have reversed to bright portions is obtained.

As will be understood from the principle of negative image generation that has been described above, the SNR of the reverse image (negative image) becomes larger the larger the white ratio of the signal light is. Consequently, it is preferable for the white ratio to be equal to or greater than 0.5, more preferable for the white ratio to be greater than 0.5, and even more preferable for the white ratio to be equal to or greater than 0.6. On the other hand, when the white ratio is too close to 1, the low frequency component increases, and when there is aberration or the like of a lens, there is the potential for it to become difficult for just the direct current component to be removed by the removing component 42, so it is preferable for the upper limit of the white ratio to be 0.9.

(Data Decoding Processing)

Next, "decoding processing" that decodes the digital data that the reproduced signal light has from the image data of the first reproduced image and the second reproduced image will be described. This processing is executed by an unillustrated control device. As mentioned above, the image data of the first reproduced image and the image data of the second reproduced image are inputted to and held in the control device. Using these two sets of image data, brightness differences are calculated in regard to each pixel of the signal light pattern. By calculating the differences, noise that is common to both sets of image data is cancelled out. Because of the difference values (positive values) that have been calculated, the code of each pixel is accurately determined, and the original digital data are decoded with a high SNR. Further, when the original digital data are decoded with a high SNR, the bit error rate (BER) drops.

For example, when the signal light pattern is a signal light pattern where binary digital data "1" and "0" are expressed by "bright" and "dark", the image data of the second reproduced image (negative image) are subtraction-processed from the image data of the first reproduced image (negative image), and brightness differences are calculated in regard to each pixel of the signal light pattern (bright/dark image). The second reproduced image (negative image) is the reverse image of the original bright/dark image, and the bright portions of the original bright/dark image are dark and the dark portions are bright. Consequently, the difference values when the brightness of the second reproduced image (negative image) has been subtracted from the brightness of the first reproduced image (positive image) become positive in the bright portions of the original bright/dark image and become negative in the dark portions of the original bright/dark image. When the codes "positive, negative" of the difference values that have been calculated are decoded as "1" and "0", the original digital data can be decoded with a high SNR.

Further, decoding processing can also be performed by subtraction-processing the image data of the second reproduced image (negative image) from the image data of the first reproduced image (positive image), generating a third reproduced image (positive image), and using this third reproduced image. When a third reproduced image (positive image) is generated using, as "bright" and "dark", the codes "positive, negative" of the difference values that have been calculated, in the third reproduced image that has been obtained by subtraction processing, the contrast becomes emphasized more than in each of the first reproduced image and the second reproduced image. By using this third reproduced image (positive image), the original digital data can be decoded with a high SNR.

Further, in the above-described example, an example has been described where the image data of the second reproduced image (negative image) are subtraction-processed from the image data of the first reproduced image (positive image), but conversely from this, the image data of the first reproduced image (positive image) can also be subtraction-processed from the image data of the second reproduced image (negative image) to calculate brightness difference values. The brightness difference values become negative in the bright portions of the original bright/dark image and become positive in the dark portions of the original bright/dark image. When the codes "positive" and "negative" of the difference values that have been calculated are decoded as "0" and "1", the original digital data can be decoded with a high SNR.

Further, when the aforementioned oversampling is being implemented, one pixel of the signal light data corresponds to plural pixels (plural light receiving elements) of the sensor arrays, so the brightness difference values are calculated per one pixel of the signal light data. That is, an average value of the brightness difference values is calculated in regard to the plural pixels of the corresponding sensor array.

Second Exemplary Embodiment

Figure 4:
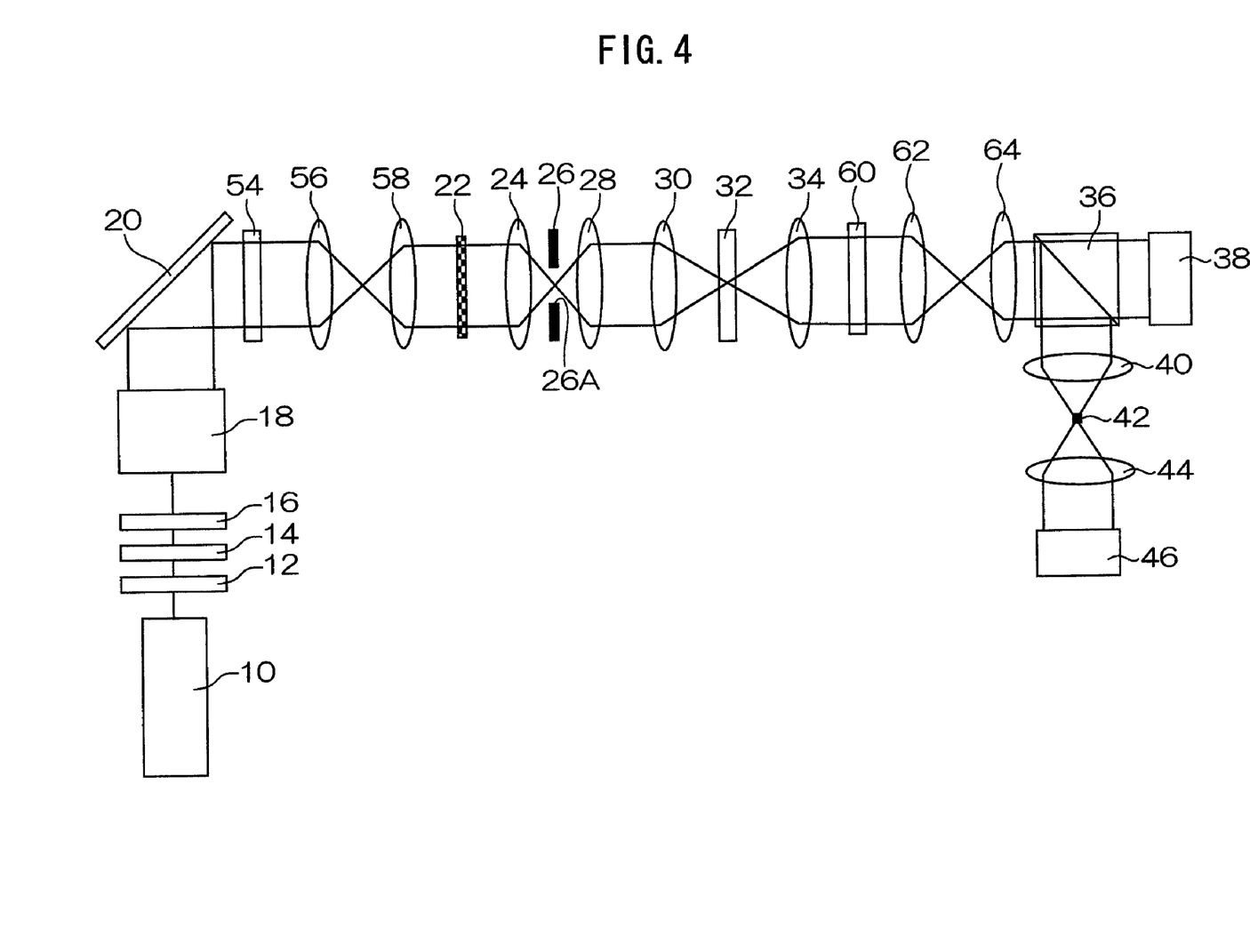
FIG. 4 is a general diagram showing the configuration of a hologram recording and reproducing device pertaining to a second exemplary embodiment of the invention.

FIG. 4 is a general diagram showing the configuration of a hologram recording and reproducing device pertaining to a second exemplary embodiment of the invention. This hologram recording and reproducing device has the same configuration as that of the hologram recording and reproducing device pertaining to the first exemplary embodiment except that two phase modulating elements and plural lens are added, so the same reference numerals will be given to the same configural portions and description of those same configural portions will be omitted.

In this hologram recording and reproducing device, a phase modulating element 54 such as a phase mask that applies a random phase, a lens 56 and a lens 58 are disposed between the reflecting mirror 20 and the spatial light modulator 22 in this order along the optical path from the reflecting mirror 20 side. Further, a phase modulating element 62 with the same configuration as that of the phase modulating element 54, a lens 62 and a lens 64 are disposed between the Fourier transform lens 34 and the half mirror 36 in this order along the optical path from the Fourier transform lens 34 side.

During recording of a hologram, the light that has been reflected by the reflecting mirror 20 passes through the phase modulating element 54, is phase-modulated, is relayed by the lenses 56 and 58, and is made incident on the spatial light modulator 22. In the spatial light modulator 22, the laser light is polarized and modulated in accordance with the displayed pattern such that the signal light and the reference light are generated. Because of the phase modulation by the phase modulating element 54, the dynamic range of the optical recording medium can be effectively used because the superimposition of the signal light and the reference light is improved and the light intensity distribution of the recording light is made uniform.

During reproduction of a hologram, the reproduced signal light that has been emitted from the optical recording medium 32 is inverse-Fourier-transformed and made into parallel light by the lens 34 and is made incident on the phase modulating element 60. The phase modulating element 60 has the same configuration as that of the phase modulating element 54, and randomness (wavefront distortion) that has been added to the signal light by the phase modulating element 54 during recording is cancelled out by the phase modulating element 60 that has the same configuration. The reproduced signal light that has passed through the phase modulating element 60 is relayed by the lenses 62 and 64 and is made incident on the half mirror 36. The reproduced signal light that has been transmitted through the half mirror 36 is detected by the sensor array 38, and the first reproduced image (positive image) is acquired.

Further, the reproduced signal light that has been reflected by the half mirror 36 is Fourier-transformed and collected by the Fourier transform lens 40, and the direct current component is selectively removed from the Fourier transform image by the removing member 42. The reproduced signal light from which the direct current component has been removed is inverse-Fourier-transformed and collected by the Fourier transform lens 44. The reproduced signal light that has been collected is detected by the sensor array 46, and the second reproduced image (negative image) is acquired.

The image data of the first reproduced image are inputted from the sensor array 38 to the unillustrated control device, and the image data of the second reproduced image are inputted from the sensor array 46 to the unillustrated control device. In the unillustrated control device, similar to the first exemplary embodiment, brightness differences are calculated in regard to each pixel of the signal light pattern using the two sets of image data comprising the image data of the first reproduced image and the image data of the second reproduced image. By calculating the differences, noise that is common to both sets of image data is cancelled out. Because of the difference values (positive or negative values) that have been calculated, the code of each pixel is accurately determined, and the original digital data are decoded with a high SNR.

Third Exemplary Embodiment (Hologram Recording and Reproducing Device)

Figure 5:
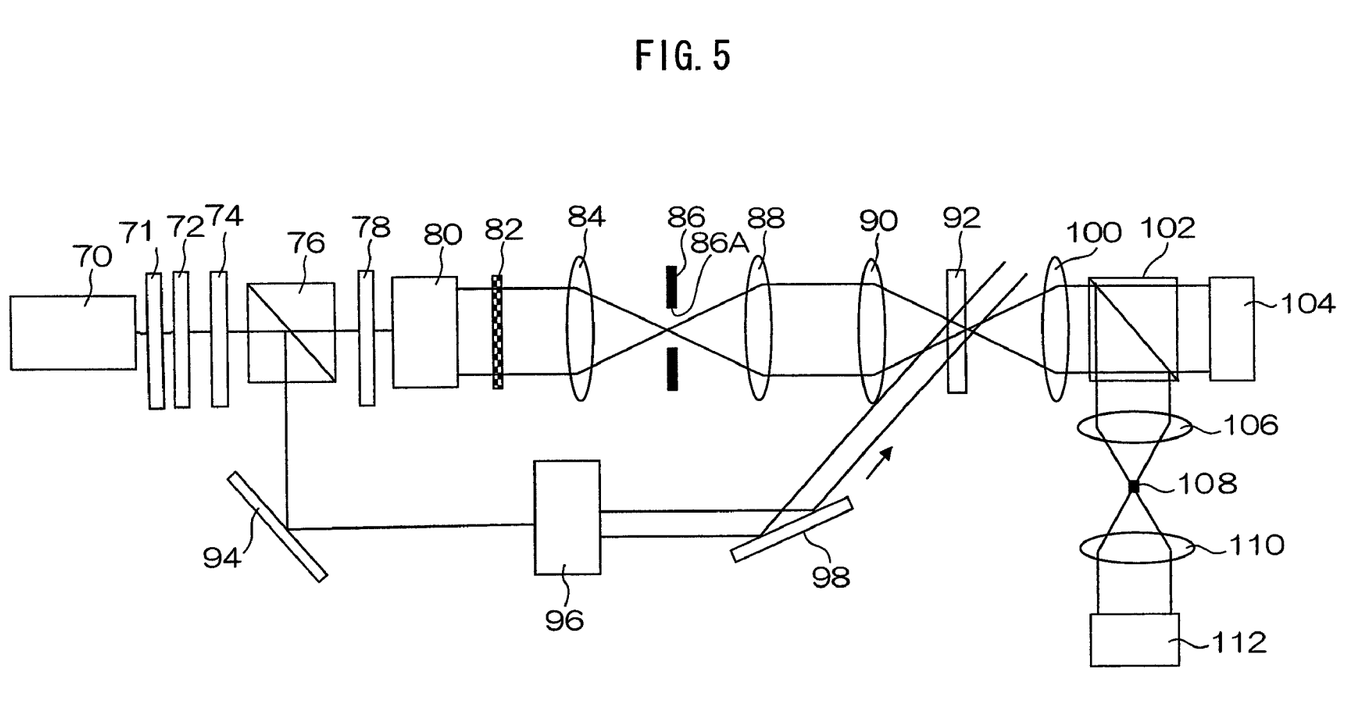
FIG. 5 is a general diagram showing the configuration of a hologram recording and reproducing device pertaining to a third exemplary embodiment of the invention.

FIG. 5 is a general diagram showing the configuration of a hologram recording and reproducing device pertaining to a third exemplary embodiment of the invention. This hologram recording and reproducing device is a "dual-beam recording method (off-axis system)" hologram recording and reproducing device that irradiates an optical recording medium with signal light and reference light as two-beam recording light from different directions. When the system is an off-axis system, an arbitrary multiplexing method can be used. For example, angle multiplexing, shift multiplexing, wavelength multiplexing, peristrophic multiplexing, and phase-code multiplexing can be utilized. In the present exemplary embodiment, a "dual-beam recording method" hologram recording and reproducing device that uses a transmissive spatial light modulator (SLM) and a transmissive optical recording medium will be described.

In the hologram recording and reproducing device, there is disposed a light source 70 that emits laser light. On the light exiting side of the light source 70, a shutter 71 that is capable of opening and closing, a ½ wavelength plate 72, a polarizing plate 74 and a polarizing beam splitter 76 are disposed in this order along the optical path from the side of the light source 70. On the light transmitting side of the polarizing beam splitter 76, a shutter 78 that is capable of opening and closing, a beam expander 80, a transmissive spatial light modulator 82, a lens 84, a light blocking plate 86 that includes an aperture 86A, a lens 88 and a Fourier transform lens 90 are disposed in this order along the optical path from the side of the polarizing beam splitter 76. The Fourier transform lens 90 Fourier-transforms light that has been made incident thereon and collects the light on an optical recording medium 92.

The shutters 71 and 78 are driven to open and close by a drive device (not shown) that is connected to a control device (not shown). As the transmissive spatial light modulator 82, a liquid crystal spatial light modulator or the like can be used. The spatial light modulator 82 is connected to a control device (not shown) via a pattern generator (not shown). The pattern generator expresses, as a bright/dark image, digital data that have been supplied from a control device to generate a signal light pattern that is displayed on the spatial light modulator 82. In the present exemplary embodiment, similar to the first exemplary embodiment, a signal light pattern whose white ratio is greater than 0.5 is used.

Figure 6:
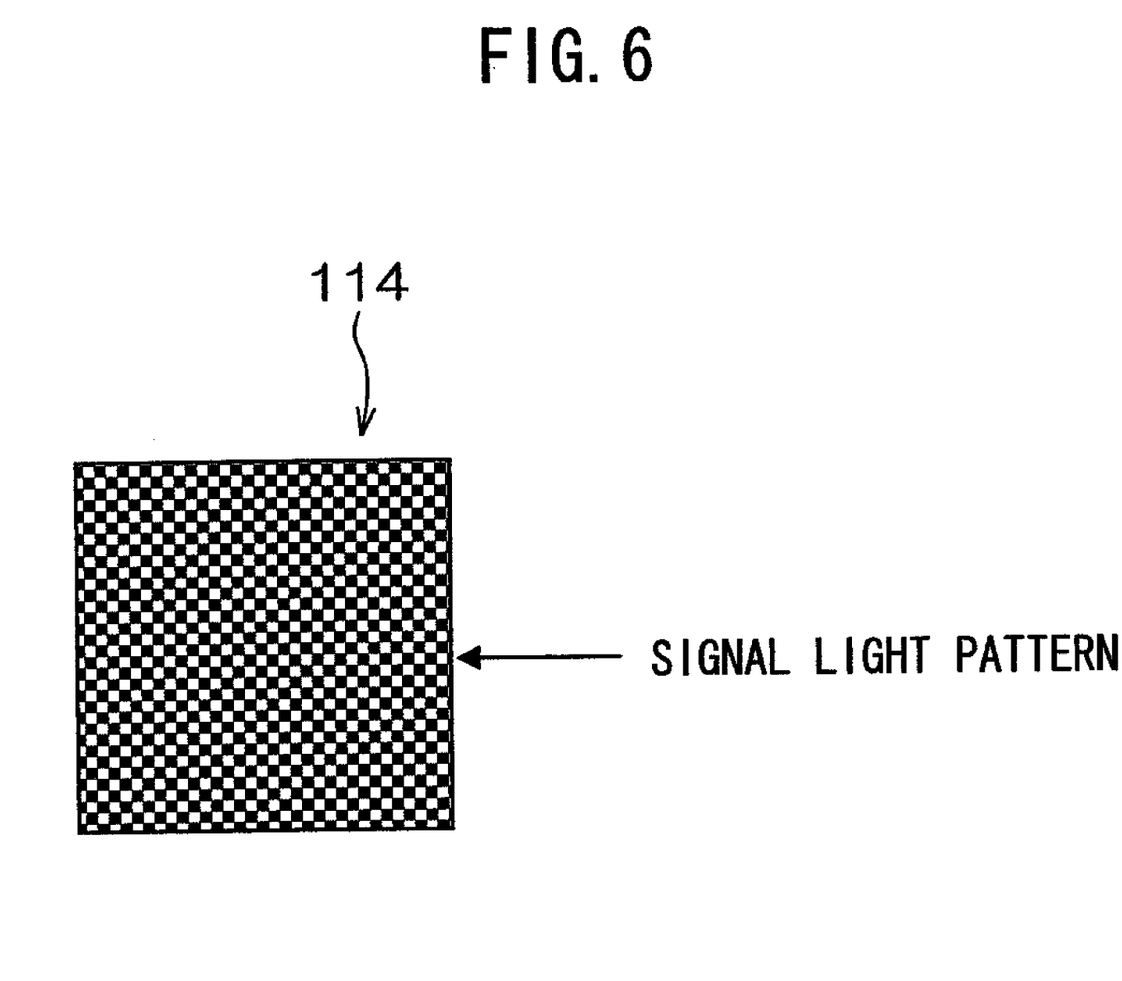
FIG. 6 is a diagram showing an example of a recording pattern that is displayed on a spatial light modulator during recording.

FIG. 6 is a diagram showing an example of a recording pattern that is displayed on the spatial light modulator 82 during recording. As shown in FIG. 6, a recording pattern 114 is configured from just a signal light pattern that generates signal light. That is, during recording, just the signal light pattern 114 is displayed on the display surface of the spatial light modulator 82, laser light that has been made incident thereon is modulated in accordance with the displayed pattern, and just the signal light is generated.

On the light reflecting side of the polarizing beam splitter 76, there is disposed a reflecting mirror 94. On the light reflecting side of the reflecting mirror 94, a beam expander 96 and a reflecting mirror 98 that reflects light that has been made incident thereon toward the optical recording medium 92 are disposed in this order along the optical path from the reflecting mirror 94 side.

On the light exiting side of the Fourier transform lens 90, there is disposed a holding stage (not shown) that holds the optical recording medium 92. The holding stage is driven by a drive device (not shown) that is connected to a control device (not shown). The optical recording medium 92 is an optical recording medium on which a hologram is capable of being recorded by a change in the index of refraction resulting from being irradiated with light. Examples thereof may include an optical recording medium that uses a photopolymer material.

On the light transmitting side of the optical recording medium 92, a Fourier transform lens 100 and half mirror 102 that transmits half of the light and reflects half of the light are disposed in this order along the optical path from the optical recording medium 92 side. The half mirror 102 functions as a "splitting component" that splits the laser light. It will be noted that, in the present exemplary embodiment, the transmitted light intensity and the reflected light intensity are equivalent.

On the light transmitting side of the half mirror 102 when seen from the Fourier transform lens 100 side, there is disposed a sensor array 104. Further, the sensor array 104 is connected to a control device (not shown). The sensor array 104 images a reproduced image that has been imaged on its light receiving surface and outputs the image data that have been obtained to a control device (not shown).

On the light reflecting side of the half mirror 102, Fourier transform lenses 106 and 110 and a sensor array 112 are disposed in this order along the optical path from the half mirror 102 side. The sensor array 112 is disposed on a focal plane (focal point plane) of the Fourier transform lens 110. Further, between the Fourier transform lenses 106 and 110, in the vicinity of the beam waist, there is disposed a removing member 108 that removes a direct current component of a Fourier transform image of the reproduced signal light.

(Hologram Recording Operation)

Next, recording operation of the hologram recording and reproducing device shown in FIG. 5 will be briefly described.

When a hologram is to be recorded, the shutters 71 and 78 are opened and laser light is emitted from the light source 70. At the same time, digital data are outputted from a control device at a predetermined timing, and a recording pattern (see FIG. 6) is displayed on the spatial light modulator 82. In the present exemplary embodiment, a signal light pattern whose white ratio is greater than 0.5 is displayed. The light intensity and polarization direction of the laser light that has been emitted from the light source 70 are adjusted by the ½ wavelength plate 72 and the polarizing plate 74, and the laser light is made incident on the polarizing beam splitter 76.

The light that has been transmitted through the polarizing beam splitter 76 passes through the shutter 78, is converted into parallel light with a large diameter by the beam expander 80, and the spatial light modulator 82 is irradiated therewith. In the spatial light modulator 82, the laser light is polarized and modulated in accordance with the displayed pattern such that signal light is generated. The signal light that has been polarized and modulated by the spatial light modulator 82 is collected by the lens 84, and the light blocking plate 86 that includes the aperture 86A is irradiated therewith. The unnecessary frequency component of the recording light that has been collected by the lens 84 is cut by the light blocking plate 86, and the remaining portion passes through the aperture 86A. The signal light that has passed through the aperture 86A is converted into parallel light by the lens 88. The signal light that has been converted into parallel light by the lens 88 is Fourier-transformed and collected by the Fourier transform lens 90, and the optical recording medium 92 is irradiated therewith.

The reflecting mirror 94 is irradiated with the light that has been reflected by the polarizing beam splitter 76. The light with which the reflecting mirror 94 has been irradiated is reflected by the reflecting mirror 94 such that its optical path is bent by 90°. The light whose optical path has been bent is made incident on the beam expander 96 and is converted into parallel light with a large diameter, and the reflecting mirror 98 is irradiated therewith. The light with which the reflecting mirror 98 has been irradiated is reflected in the direction of the optical recording medium 92 by the reflecting mirror 98 such that the position where the optical recording medium 92 is irradiated with the signal light is irradiated with the reference light. In the position that is irradiated with the signal light and the reference light, an interference fringe that is formed as a result of the signal light and the reference light interfering with each other is recorded as a Fourier transform hologram in the optical recording medium 92.

(Hologram Reproducing Operation)

Next, reproducing operation of the hologram recording and reproducing device shown in FIG. 5 will be described. In the present exemplary embodiment, two reproduced images comprising a positive image and a negative image are detected from one Fourier transform hologram that has been recorded using the signal light pattern whose white ratio is greater than 0.5. First, when the signal light is to be reproduced from the hologram that has been recorded in the optical recording medium 92, the shutters 71 and 78 are opened and closed, respectively, and laser light is emitted from the light source 70 such that the optical recording medium 92 is irradiated with just the reference light.

The light intensity and the polarization direction of the laser light that has been emitted from the light source 70 are, in the same manner as in the case of recording, adjusted by the ½ wavelength plate 72 and the polarizing plate 74, and the laser light is made incident on the polarizing beam splitter 76. The light that has been transmitted through the polarizing beam splitter 76 is blocked by the shutter 78. Meanwhile, the light that has been reflected by the polarizing beam splitter 76 is reflected by the reflecting mirror 94, is converted into parallel light with a large diameter by the beam expander 96, and is reflected in the direction of the optical recording medium 92 by the reflecting mirror 98, and the region of the optical recording medium 92 in which the hologram has been recorded is irradiated with the reference light for reading. That is, the optical recording medium 92 is irradiated with just the reference light as reading light.

When the reference light with which the optical recording medium 92 has been irradiated is transmitted through the optical recording medium 92, the reference light is diffracted by the hologram, and the transmitted diffracted light (reproduced signal light) is emitted toward the lens 100. The reproduced signal light that has been emitted from the optical recording medium 92 is made into parallel light by the lens 100 and is made incident on the half mirror 102. The reproduced signal light that has been transmitted through the half mirror 102 is detected by the sensor array 104, and a first reproduced image (positive image) is acquired.

The reproduced signal light that has been reflected by the half mirror 102 is Fourier-transformed and collected by the Fourier transform lens 106, and a direct current component is selectively removed from the Fourier transform image by the removing member 108. The reproduced signal light from which the direct current component has been removed is inverse-Fourier-transformed and collected by the Fourier transform lens 110 and is detected by the sensor array 112, and a second reproduced image (negative image) is acquired.

The image data of the first reproduced image are inputted from the sensor array 104 to the unillustrated control device, and the image data of the second reproduced image are inputted from the sensor array 112 to the unillustrated control device. In the unillustrated control device, similar to the first exemplary embodiment, brightness differences are calculated in regard to each pixel of the signal light pattern using the two sets of image data comprising the image data of the first reproduced image and the image data of the second reproduced image. By calculating the differences, noise that is common to both sets of image data is cancelled out. Because of the difference values (positive values) that have been calculated, the code of each pixel is accurately determined, and the original digital data are decoded with a high SNR.

Figure 7A:
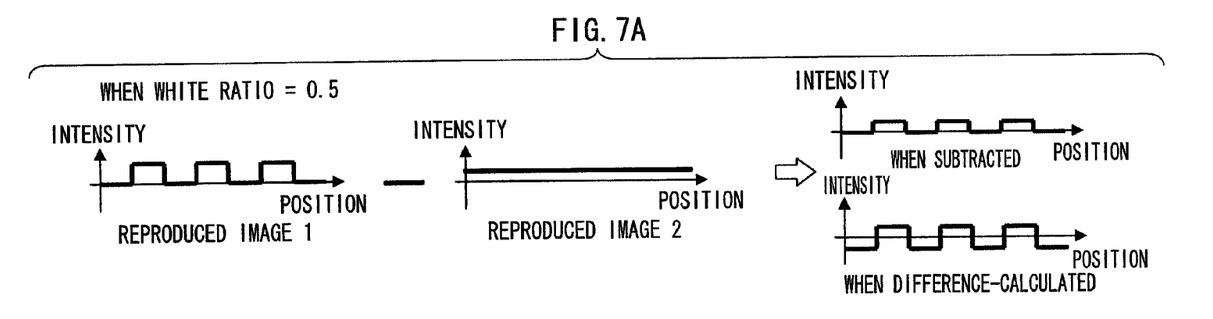
FIG. 7A is a diagram describing the reason why, in regard to a case where white ratio=0.5, original digital data are decoded from two reproduced images regardless of the value of the white ratio of a signal light pattern.
Figure 7B:
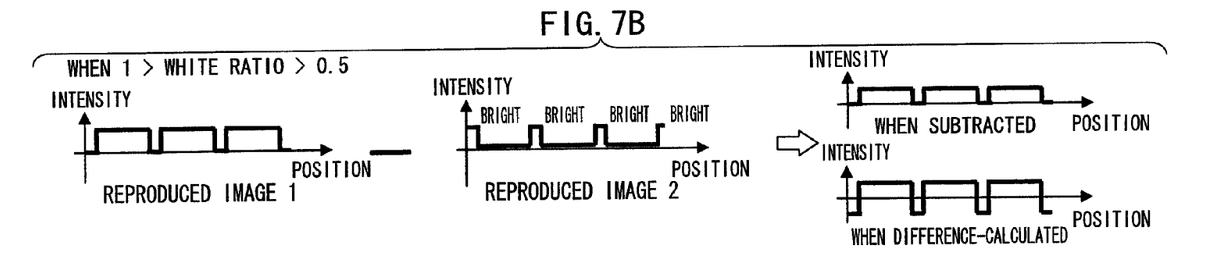
FIG. 7B is a diagram describing the reason why, in regard to a case where 1>white ratio>0.5, original digital data are decoded from two reproduced images regardless of the value of the white ratio of a signal light pattern.
Figure 7C:
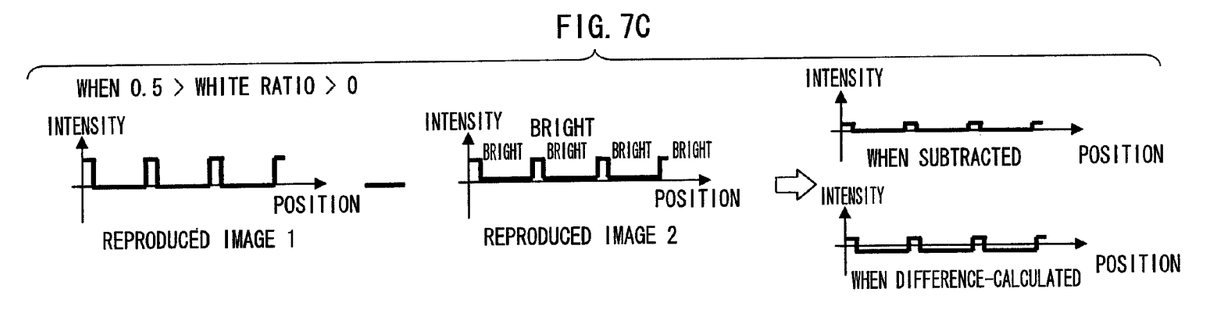
FIG. 7C is a diagram describing the reason why, in regard to a case where 0.5>white ratio>0, original digital data are decoded from two reproduced images regardless of the value of the white ratio of a signal light pattern.

It will be noted that, in the preceding exemplary embodiments, cases have been described where the white ratio of the signal light pattern is greater than 0.5, but two reproduced images comprising an image in which a direct current component is included and an image in which a direct current component is not included can, regardless of the value of the white ratio (DC ratio) of the signal light pattern, be obtained from one Fourier transform hologram that has been recorded. Further, as shown in FIG. 7A to FIG. 7C, even in a case where white ratio=0.5, a case where 1>white ratio>0.5, and a case where 0.5>white ratio>0, by comparing those by subtraction processing or difference calculation, noise that is common to both can be reduced, and the original digital data can be decoded. It will be noted that, in difference calculation, decoding processing is implemented in consideration of negative codes also, but in the case of subtraction processing, decoding processing is implemented using just positive values.

Here, "SNR" is defined as: SNR=(differences in average intensity between ON pixels and OFF pixels)/(spreading, variations in intensity distribution between ON pixels and OFF pixels). As will be understood when FIG. 7A to FIG. 7C are compared, when the white ratio is greater than 0.5, a negative image is obtained when the direct current component is applied as mentioned above, and by calculating differences with the positive image, not only can noise be cut but differences in average intensity between ON pixels and OFF pixels can be increased, that is, the contrast ratio becomes larger and the SNR improves. Consequently, from the standpoint of SNR improvement, it is preferable to use a signal light pattern whose white ratio is equal to or greater than 0.5 and more preferable to use a signal light pattern whose white ratio is greater than 0.5.

What is claimed is:

1. An optical reproducing device comprising:
 a reproducing component that includes a light source that emits coherent light, a spatial light modulator that is configured by plural pixel components that are two-dimensionally arrayed and which modulates and outputs, per pixel and in accordance with a display pattern, light that has been made incident thereon from the light source, and a light guiding component that guides the light that has been modulated by the spatial light modulator to an optical recording medium, with the reproducing component irradiating, with reference light that has been generated by the spatial light modulator as reading light, a Fourier transform hologram that has been recorded in the optical recording medium using signal light and reference light, to thereby reproduce the signal light from the optical recording medium;
 a splitting component that is disposed on a signal light exiting side of the reproducing component and splits, into two light waves, the signal light that has been made incident thereon from the optical recording medium side;
 a first image acquiring component that is disposed on an exiting side of the one split light wave that has been split by the splitting component and detects the one split light wave to acquire a first reproduced image;

a second image acquiring component that is disposed on an exiting side of the other split light wave that has been split by the splitting component and detects light where a direct current component has been removed from the other split light wave to acquire a second reproduced image; and a decoding component that uses the first reproduced image and the second reproduced image to decode data that the signal light has.

2. The optical reproducing device according to claim 1, wherein the white ratio of the signal light is equal to or greater than 0.5.

3. The optical reproducing device according to claim 1, wherein the second image acquiring component is disposed with a first lens that Fourier-transforms light that has been made incident thereon, a removing component that removes a direct current component from a Fourier transform image, and a second lens that inverse-Fourier-transforms light that has been made incident thereon, and the second image acquiring component Fourier-transforms the other split light wave that has been made incident on the first lens to generate the Fourier transform image, removes a direct current component from the Fourier transform image by the removing component, and inverse-Fourier-transforms light that has been made incident on the second lens to generate light from which the direct current component has been removed.

4. The optical reproducing device according to claim 2, wherein the second image acquiring component is disposed with a first lens that Fourier-transforms light that has been made incident thereon, a removing component that removes a direct current component from a Fourier transform image, and a second lens that inverse-Fourier-transforms light that has been made incident thereon, and the second image acquiring component Fourier-transforms the other split light wave that has been made incident on the first lens to generate the Fourier transform image, removes a direct current component from the Fourier transform image by the removing component, and inverse-Fourier-transforms light that has been made incident on the second lens to generate light from which the direct current component has been removed.

5. The optical reproducing device according to claim 1, wherein when a phase modulating element is inserted between the light source and the spatial light modulator in the reproducing component, a phase modulating element that is the same as the phase modulating element is disposed on a signal light incident side of the splitting component.

6. The optical reproducing device according to claim 1, wherein the Fourier transform hologram is recorded by a dual-beam method where the optical recording medium is irradiated simultaneously from different directions with signal light and reference light to record a hologram.

7. An optical reproducing method comprising:

irradiating, with reference light as reading light, a Fourier transform hologram that has been recorded using signal light and reference light, to thereby reproduce the signal light from an optical recording medium;

splitting, into two light waves, the signal light that has been reproduced from the optical recording medium;

detecting the one split light wave that has been split to acquire a first reproduced image; and detecting light where a direct current component has been removed from the other split light wave that has been split to acquire a second reproduced image.

8. The optical reproducing method according to claim 7, wherein the white ratio of the signal light is equal to or greater than 0.5.

* * * * *